United States Patent Office 3,573,895
Patented Apr. 6, 1971

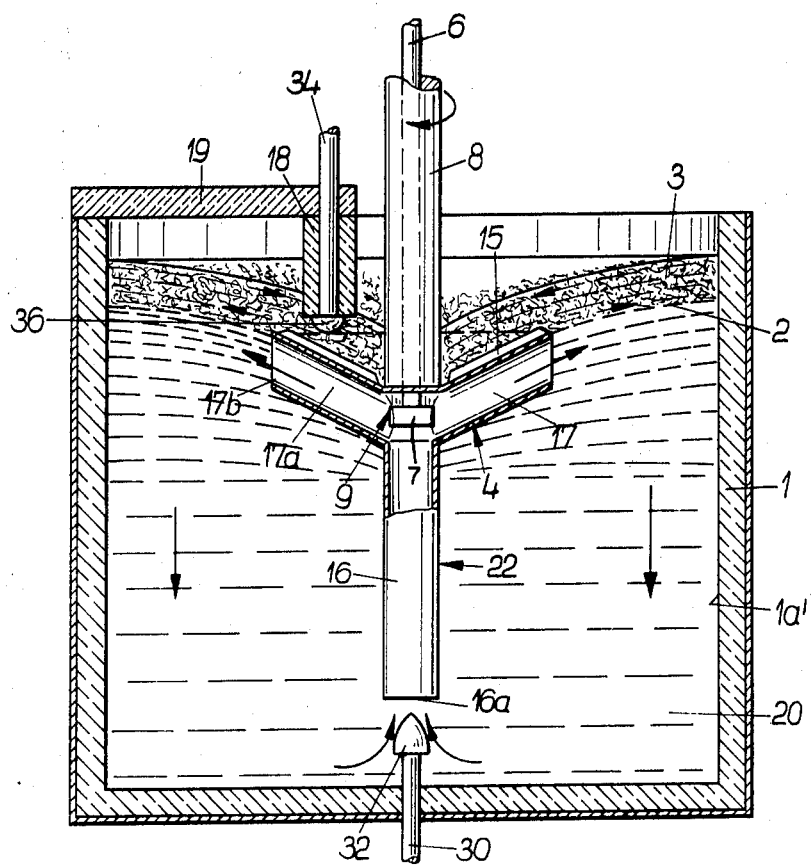

3,573,895
METHOD FOR IMPROVING REACTIONS BETWEEN TWO COMPONENTS OF A METALLURGICAL MELT
Jan-Erik Östberg, Torps Sateri, Bettna, Sweden
Filed Feb. 9, 1968, Ser. No. 704,458
Claims priority, application Sweden, Feb. 9, 1967, 1,800/67
Int. Cl. C21c 7/00, 7/02
U.S. Cl. 75—59                               8 Claims

ABSTRACT OF THE DISCLOSURE

A method of improving the reaction between two components of different specific gravity or for homogenizing mixtures of components of different specific weight at least one of which is a fluid such as between a metallurgical melt and a slag layer, comprises producing a flow in the reaction zone between the two liquids of different specific gravities or specific weight and simultaneously introducing gaseous medium into the area of the reaction zone between the surfaces of the two layers. For this purpose, an inert gas may be used or a gas such as oxygen or hydrogen which will react with at least one phase or component of the mixture. It is also desirable in some instances to introduce a gas having a desulfurizing effect.

An apparatus for carrying out the method includes a rotating pump element disposed to draw the heavier liquid upwardly and discharge it adjacent the surface of the lighter liquid and which includes means for discharging a gas in the vicinity of the surface of the lighter liquid or upwardly and through the pump.

SUMMARY OF THE INVENTION

This invention relates in general to a method and apparatus for improving the reaction between two liquids or for producing a blending or homogenizing of the two liquids and in particular to a new and useful method and apparatus for improving the circulating flow in a metallurgical reaction vessel between two liquids of different specific gravities and wherein a gas is introduced at the reaction zone.

The present invention is particularly applicable for accelerating a physico-chemical process of interacting fluids, particularly of metal melts at temperatures above 800° C. Stirring and pumping devices are known for facilitating the flow of the reaction materials in a reaction zone but such devices do not always produce the desirable mixing of the liquids of two different specific gravities at least to the expected extent theoretically possible. This is true even though the devices produce a considerable agitation in the reaction zone between the two phases. It would appear that the known devices and method do effect the conveying of the components, but it has been found that a pronounced turbulence in the reaction zone is much more effective to increase the reaction rate.

The invention makes use of stirring and pumping devices in order to effect a fast reaction procedure and to mix or homogenize the mixtures of liquids or components of different specific weight wherein at least one component is a fluid phase. The phase adjacent the fluid phase may be solid, liquid or gaseous and in some instances there are systems where the reaction takes place between one or several phases or systems which are treated in an evacuated vessel. Because metallurgical systems are usually carried out at relatively high temperatures, the conditions which are present are conducive to the carrying out of the reaction at very high speed. Therefore, when it is determined that even with such ideal temperature conditions the complete reaction does not take place in the desired short reaction period, the reason therefor is that the actual reaction takes place in a very thin locally limited zone. Therefore, in order to carry out maximum local reaction speed, it is necessary that the whole volume of the system participate in the reaction in the shortest possible time and therefore it is necessary to bring the continuous volume components which have not yet been reacted into the reaction zones and to continuously remove the reaction products from the zones.

In accordance with the invention, a rotating or translating device is arranged in the liquid mixture and it is actuated to produce a turbulent flow in the mixture. Simultaneously a gaseous medium is introduced into the area of the reaction zone defined between the surfaces of the two phase components of different specific weights. The gas is advantageously introduced in a manner to aid in the turbulence and to increase the flow energy so that the components are moved through the reaction zone in a continuous and fast manner.

By providing the movement of the phase adjacent the reaction zone defined between the two surfaces of different components and in addition by feeding gas into the liquid mixture, it is possible to distribute the components through the reaction zone in a rapid manner to increase the reaction rate. A feature of the method is that the gas is added during the movement of the constituents by the means to produce the turbulent flow in the reaction zone in a manner such that there is not a removal of one of the phases from the reaction area. With the preferred method, a variation of the speed of movement of the device for circulating one of the components is carried out along with the control of the amount of gas being fed into the zone so that optimum feeding in conditions for the gas and the movement of the components may be obtained. The gas is introduced in a manner such that its direction as well as its distribution and force is controlled to produce the most desirable reaction conditions. The gas may, for example, be introduced into the inner area of the liquid volume when an intensive reaction between the gas and the liquid is to be obtained. It is also possible to utilize the feeding device primarily for the introduction of the media to be reacted into the area of the reaction zone while the gas which is being introduced predominantly causes the turbulent flow within the reaction zone.

An excellent turbulence and thus an excellent enlargement of the effective reaction zone is obtained if the stirring device operates to produce only a minor pumping effect and the device operates as a rotating element such as a vane wheel. On the other hand, it is very advantageous to introduce the gas over a wide surface area by means of a large number of feed-in apertures, while stirring is carried out. When the gas to be introduced is to react with the liquid, for example in the admixture of oxygen to iron or a steel melt, it is desirable that a great amount of stirring as well as a wide area feeding of the gas is carried out.

Accordingly it is an object of the invention to provide a device for improving the reaction between liquids of different specific gravities wherein the liquids are moved to produce a turbulent flow in the reaction zone defined between the liquid layers and in addition a gas is circulated through at least one of the phases and preferably to the reaction zone.

A further object of the invention is to provide a method of improving the mixing or homogenizing of a mixture of at least two components of different specific gravity, one of which is a fluid phase wherein a gas is directed into the liquid adjacent the boundary between the liquids while the liquid is being stirred, and wherein the gas may be an inert gas which does not react with the constituents but aids in producing increased turbulence and intermixing of the components, or the gas may be a reactive gas such as an oxygen-carrying or hydrocarbon carrying gas which interacts with the materials being mixed.

A further object of the invention is to provide a device for facilitating the intermixing of components particularly in a metallurgical melt and for aiding the reaction between the components along a reaction zone between the layers of the liquids which includes a rotatable element adapted to rotate adjacent the reaction zone and having means for discharging gas in the reaction zone.

A further object of the invention is to provide a device for aiding in the reaction of the components of a metallurgical furnace melt which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWING

The only figure of the drawing is a somewhat schematic transverse sectional view of a crucible having a reaction improving device constructed in accordance with the invention.

DETAILED DESCRIPTION OF THE PREFERRED EMBODIMENT

Referring to the drawing in particular, the invention embodied therein comprises the metallurgical crucible 1 which is filled with a liquid or melt 20, for example a steel melt up to a level line 2. Above the level line 2, the crucible 1 contains a layer of a liquid of lower specific gravity or a slag layer 3.

In accordance with the invention, a mixing device or reaction zone reaction stimulator generally designated 22 includes a first pump or impeller generally designated 4 having a plurality of impeller arms or pipe elements 17 which are centrally connected to an intake pipe or suction conduit 16. The suction conduit 16 is located well within the liquid 20 and takes suction at the lower end thereof adjacent the bottom of the crucible 1. The flow of liquid is upwardly through the inlet 16a and then radially outwardly through each pipe arm portion 17a of the impeller 4 and it is discharged through the exit 17b adjacent the reaction zone which is defined between the top of the layer 20 and the bottom of the lighter layer 3 over the line indicated in the drawing at 2.

In accordance with the improved method of the invention, the impeller 17 is affixed to the end of a shaft 8 which, in turn, is affixed at its upper end to the shaft of a rotating motor (not shown). The shaft 8 is hollow and carries a conduit or pipe 6 having a fitting 7 at its lower end which is positioned centrally at the upper end of the suction pipe 16. Rotation of the shaft 8 causes rotation of the impeller 4 and the upward flow of the liquid melt 20 in pipe 16 and its radial discharge through passages 17a outwardly in the direction of the arrows.

In accordance with a feature of the invention gas is discharged through one or more nozzles 9 of the fitting 7 in order to aid in providing an induced flow upwardly through the suction pipe 16 and a discharge of the gas outwardly through the opening 17b against the top of the surface of the liquid 20.

While it should be appreciated that the gas may be introduced only through the nozzle member 7 for flow outwardly through the conduit element 17a, if desired, it is also possible to add the same or additional gas through either a bottom conduit 30 for discharge through a nozzle 32 directly upwardly into the opening 16a of the suction tube 16. In this event, the gas flowing upwardly through the tube 16 induces the upward flow of the liquid 20 along with the gas.

In those instances where the surface of the lighter layer 3 is to be agitated or where an interreaction of the gas with either the material of the layer 3 or the materials on the surface of the liquid 20 is desired, the gas may advantageously be admitted through a conduit 34 for discharge through a nozzle 36, for example. The centrifugal outward flowing of the lighter slag layer 3 can be supported by fins or blades 15 which are defined at the upper ends of the impeller 4. A braking body or member 18 is defined as a deflector extending downwardly from a wall portion or cover 19 and located in the slag layer 3 so as to discourage any eddy-formations at such location.

By using the device and method of the invention, the following improvements are obtained:

(a) Through the sucking in of the liquid through the apertures 16a of the vertical pipe, a circulation is started in the liquid 20 of greater specific gravity;

(b) Due to the introduction of the gas through the vertical feed pipe and through the arm 17a, an excellent distribution within the entire liquid bath is obtained and an effective reaction zone is created; and (c) Due to the partial entry of the liquid into the vertical feed pipe and due to the control of the gas pressure, the liquid column in the rotating device is influenced so that favorable flow conditions will prevail.

In accordance with the inventive method it is possible to use a neutral or inert gas, for example argon, in which case the gas serves only for generating high turbulence in the area of the reaction zone between the components of the mixture and does not provide any interaction or chemical reaction. On the other hand, the gas may be a medium containing, for example, oxygen or hydrogen which reacts with at least one of the phases or components of the mixture. In processing iron or metal melts, the invention provides for the introduction of gas which has a desulfurizing effect. This desulfurizing effect may be produced by the gas itself or by the reaction with non-metallic components of the system.

It is desirable that the gas be introduced either by use of a stirring device in a manner such that the gas will be deflected laterally outwardly to the surface bounding the two liquid components.

An increased turbulence and an acceleration of the reaction may be achieved if the gas is introduced through a rotating member directly below the basic level of the liquid. By such an arrangement, an advantageous stirring and rinsing effect of the gas is produced in the overlaying phase, particularly if the phase is a thick fluid so that different composition gradients are compensated. In some instances it is desirable to use devices to introduce the gas at fixed locations adjacent a rotating stirring and pumping device. A further modification of the method includes the use of solids which support the reaction in addition to the gaseous medium which is introduced directly into the mixture or melt.

While a specific embodiment of the invention has been shown and described in detail to illustrate the application of the inventive principles, it will be understood that the invention may be embodied otherwise without departing from such principles.

What is claimed is:

1. A method of treating a metallurgical melt having a slag layer component floating on a molten metal layer component in order to effect a rapid reaction process between the components, comprising moving an impeller through the mixture to generate a turbulent flow adjacent to the level of the slag, and simultaneously introducing a gaseous medium into the reaction zone defined between the surface of the slag and the surface of the molten metal.

2. A method according to claim 1, wherein a natural gas is introduced into the mixture, 3. A method according to claim 1, wherein argon is introduced into the mixture.

4. A method according to claim 1, wherein a gas medium containing oxygen is introduced into the mixture in order to react with at least one of the phases of the mixture.

5. A method according to claim 1, wherein a hydrocarbon is introduced with the gas into the mixture.

6. A method according to claim 1, wherein a desulfurizing gas is introduced into the mixture.

7. A method according to claim 1, wherein the higher density component is moved outwardly from a central location adjacent the reaction zone defined between the contacting surfaces of the two components and the gas is directed into the reaction zone.

8. A method according to claim 1, wherein the gas is introduced into the reaction zone from a stationary location.

References Cited

UNITED STATES PATENTS

| | | | |
|---|---|---|---|
| 2,195,092 | 3/1940 | Muller et al. | 266—34 |
| 2,319,402 | 5/1943 | Hever | 266—34 |
| 2,397,737 | 4/1946 | Hever | 75—55 |
| 2,660,525 | 11/1953 | Foster | 75—77 |
| 3,230,075 | 1/1966 | Nakamura | 75—59 |
| 3,278,295 | 10/1966 | Ostberg | 75—61 |

FOREIGN PATENTS

| | | | |
|---|---|---|---|
| 515,250 | 11/1939 | Great Britain | 75—61 |
| 765,423 | 1/1957 | Great Britain | 75—61 |

L. DEWAYNE RUTLEDGE, Primary Examiner

G. K. WHITE, Assistant Examiner

U.S. Cl. X.R.

75—61, 93; 266—34